(12) United States Patent
Mitchell (10) Patent No.: US 7,199,876 B2
(45) Date of Patent: Apr. 3, 2007

(54) COMPACT HYPERSPECTRAL IMAGER (75) Inventor: Thomas A. Mitchell, Nazareth, PA (US)

(73) Assignee: Wavefront Research, Inc., Bethlehem, PA (US)

(*) Notice: Subject to any disclaimer, the term of this patent is extended or adjusted under 35 U.S.C. 154(b) by 273 days.

(21) Appl. No.: 10/750,014

(22) Filed: Dec. 31, 2003

(65) Prior Publication Data
US 2004/0156048 A1 Aug. 12, 2004

Related U.S. Application Data (60) Provisional application No. 60/437,629, filed on Dec. 31, 2002.

(51) Int. Cl.
G01J 3/28 (2006.01)

(52) U.S. Cl. ....................... 356/328; 356/326

(58) Field of Classification Search ................ 356/328, 356/334
See application file for complete search history.

(56) References Cited

U.S. PATENT DOCUMENTS 3,748,015 A  7/1973 Offner ........................ 350/55
5,329,353 A * 7/1994 Ichimura et al. ............ 356/328
5,717,487 A  2/1998 Davies ........................ 356/328
6,288,781 B1 * 9/2001 Lobb .......................... 356/326
2003/0184748 A1 * 10/2003 McCarthy .................... 356/328

OTHER PUBLICATIONS

NASA Contract No. NAS 7-918 Technical Support Package on "Low Distortion Imaging Spectrometers" for NASA Tech Brief, vol. 23, No. 3, Mar. 1999.
U.S. Appl. No. 60/437,629 filed Dec. 31, 2002. Applicant: Thomas A. Mitchell. Title: Compact Hyperspectral Imager.

* cited by examiner

Primary Examiner—Gregory J. Toatley, Jr.
Assistant Examiner—Kara Geisel
(74) Attorney, Agent, or Firm—Burns & Levinson LLP; Jacob N. Erlich; Orlando Lopez (57) ABSTRACT A hyperspectral imager including a first optical sub-system, at least one slit element, a second optical sub-system, at least one reflective dispersive element located at a center plane, and at least one detecting element located at substantially an image surface. During operation, the first optical sub-system images, onto the slit element(s), electromagnetic radiation originating at a source. The second optical sub-system substantially collimates, at a center plane, electromagnetic radiation emanating from the slit element(s). The second optical sub-system also images, onto the image surface, the electromagnetic radiation reflected from the reflective dispersive element(s). The detecting element(s) detect the dispersed electromagnetic radiation reflected from the reflective dispersive element(s).

21 Claims, 6 Drawing Sheets

COMPACT HYPERSPECTRAL IMAGER

CROSS REFERENCE TO RELATED APPLICATIONS

This application claims priority of U.S. Provisional Application 60/437,629 filed on Dec. 31, 2002, which is incorporated by reference herein.

BACKGROUND OF THE INVENTION

This invention relates generally to hyperspectral imagers, and, more particularly, to a hyperspectral imager design that is easier and less costly to fabricate, more compact in physical size and mass, and superior in spectral and spatial imaging quality than previous designs.

A hyperspectral imager is a known device that is commonly used to examine the spectral, or wavelength dependent, content of an object or scene. (Hyperspectral imagers are also referred to as imaging spectrometers.) In a hyperspectral imager light emitted or reflected by a given object or scene is imaged onto the entrance of a spectrometer, usually a slit element that transmits a single line image of the object or scene. The spectrometer in turn re-images this light to another location while dispersing this light according to its wavelength in a direction orthogonal to the orientation of the slit element, where it can readily be observed or recorded. In this manner, each slice of the object or scene is decomposed into a two-dimensional data array, and by scanning the object or scene in line-by-line increments, a three-dimensional data cube is formed.

Because every material has a unique spectral signature, the hyperspectral imager has become a very useful scientific tool in a broad range of scientific and industrial applications including, but not limited to, the monitoring of regional and global environmental conditions, the identification of both airborne and terrestrial objects and in surveillance imagery for remote sensing applications, assessment of unknown substances in forensic applications, the precise characterization of color spectra in colorimetry, and even the assessment and irrigation scheduling of crops in the farming industry.

Current optically fast hyperspectral imager designs are either too large in size for many applications, including but not limited to, unmanned aircraft surveillance, and forensic fieldwork.

It is therefore an object of this invention to provide a hyperspectral imager design that is compact in physical size.

It is a further object of this invention to provide a hyperspectral imager design that is simple in mechanical design with reduced alignment tolerances.

It is a further object of this invention to provide a hyperspectral imager design that is low in cost to fabricate.

It is a further object of this invention to provide a hyperspectral imager design that provides a high degree of spatial and spectral image quality that is relatively free of spatial and spectral image distortions.

It is a still further object of this invention to provide a hyperspectral imager design that operates over multiple bands of wavelength, forming a separate spectral image for each band.

SUMMARY OF THE INVENTION

The objects set forth above as well as further and other objects and advantages of the present invention are achieved by the embodiments of the invention described herein below.

Prior art uses either reflective of catadioptric spectrometers, which are limited in their compactness due to the inherent obscuration effect of mirrors, or use refractive spectrometers with a fold mirror located between the slit element and the spectrometer lens in order to insert the line image into the spectrometer. Furthermore, the imaging lens and spectrometer lens of these prior art systems are oriented along separate optical axes. In this invention, an improved design form allows for the imaging lens and spectrometer lens to share the same optical axis, in addition to eliminating the need for a fold mirror to be located between the imager and spectrometer. This provides several advantages including, but not limited to, a simplified mounting configuration that allows for a single mechanical barrel assembly to be used, resulting in a reduction in mechanical alignment tolerances and a reduction in the cost of the mechanical assembly.

In addition, the shared optical axis allows the angle of the dispersing element with respect to the plane perpendicular to the optical axis to be reduced, and in many cases made zero, such that spectral smile and keystone distortions are greatly reduced. This is particularly useful in the facilitation of recognition algorithms for high performance hyperspectral imaging applications.

For a better understanding of the present invention, together with other and further objects thereof, reference is made to the accompanying drawings and detailed description and its scope will be pointed out in the appended claims.

DETAILED DESCRIPTION OF THE INVENTION

Figure 1:
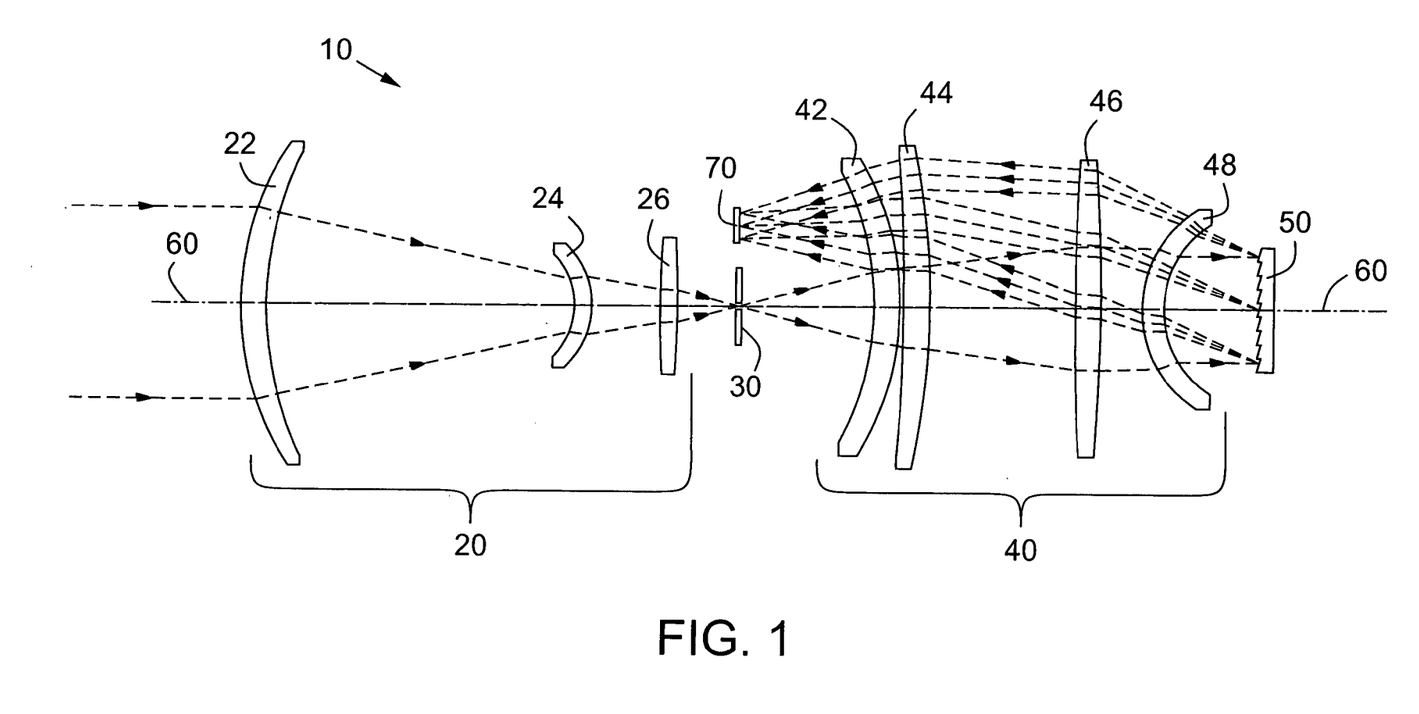
FIG. 1 is a schematic sectional view of an embodiment of an inline hyperspectral imager of the present invention, taken along the optical axis in the plane parallel to the direction of dispersion.

Reference is made to FIG. 1, which is a schematic sectional view of an embodiment of this invention 10, taken along the optical axis 60 in the plane parallel to the direction of dispersion. Electromagnetic radiation, typically in the ultraviolet, visible, and/or infrared bands, hereinafter referred to generally as light, emitted or reflected by a given object, either real or virtual, (also referred to as a source) is imaged by the imaging lens 20 comprised of one or more reflective or refractive elements, in this embodiment made up of refractive elements 22, 24, and 26, onto a slit or other method of extracting a line image for use as input to the spectrometer, hereinafter referred to generally as a slit element 30. Light emanating from the slit element 30 is substantially collimated by the optical subassembly 40, which can generally be comprised of one or more refractive or reflective elements, in this embodiment made up of refractive elements 42, 44, 46, and 48, that is inline with the imaging lens 20 such that they share a common optical axis 60. (The location at which the optical subassembly 40 substantially collimates the electromagnetic radiation emanating from the slit element 30 is referred to as a center plane.) The substantially collimated light is incident upon a reflective dispersing element (which is located at substantially the center plane), the preferred embodiment of which is a blazed surface relief diffraction grating, but in general is any method of angularly separating light energy according to its wavelength, hereinafter referred to generally as a dispersing element 50. In the embodiment in which the dispersing element 50 is a blazed surface relief diffraction grating, the substantially collimated light is diffracted at various angles according to wavelength. The dispersed reflected electromagnetic radiation is re-imaged by the optical subassembly 40 onto a CCD array, phosphorescent screen, photographic film, microbolometer array, or other means of detecting light energy, hereinafter referred to generally as a detecting element 70. (The location at which the optical subassembly 40 re-images the dispersed reflected electromagnetic radiation is referred to as an image surface.) The detecting element(s) 70 detects the dispersed electromagnetic radiation reflected from the reflective dispersive element(s) 50.

By allowing the imaging lens 20 and spectrometer lens assembly 40 to share a common optical axis 60, no fold mirror is required to direct the image formed by the imaging lens 20 into the spectrometer lens assembly 40. The elimination of this fold mirror provides many advantages including, but not limited to, a simplified mounting configuration that allows for a single mechanical barrel assembly to be used. This results in a reduction in mechanical alignment tolerances, an improved overall compactness of the system, and a reduction in the cost of the mechanical assembly. A further advantage is the reduction in the tilt of the dispersing element with respect to the plane perpendicular to the optical axis, which in many cases can be made zero such that spectral smile and keystone distortions are greatly reduced.

Figure 2A:
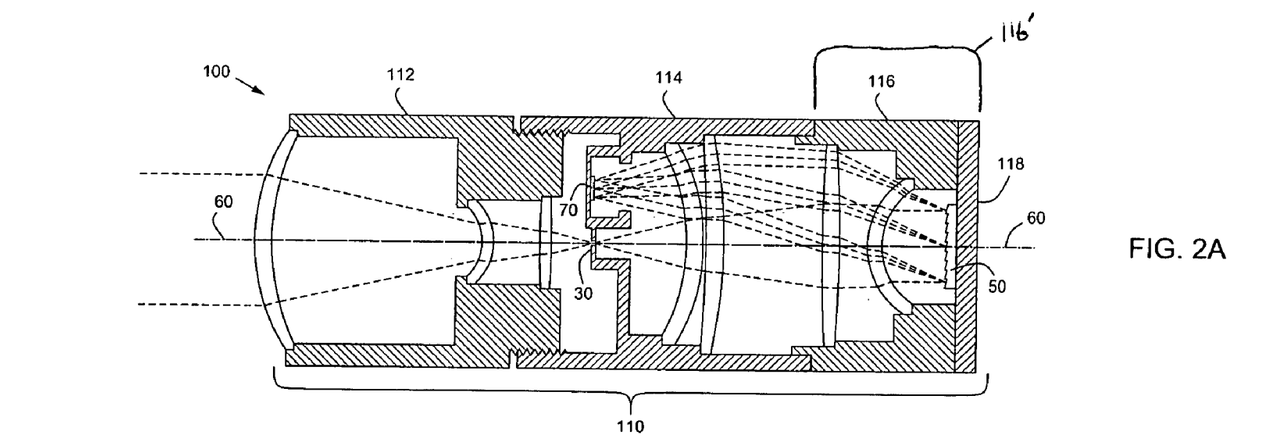
FIGS. 2A–2B are schematic sectional views of the embodiment of the present invention illustrated in FIG. 1 mounted in a typical housing, taken along the optical axis in the plane parallel to the direction of dispersion (FIG. 2A) and in the plane perpendicular to the direction of dispersion (FIG. 2B)

Some of the advantages of this inline configuration can be seen in FIG. 2A, which illustrates a mounted version of system 10 in the present invention, taken along the optical axis 60 in the plane parallel to the direction of dispersion. This mounted system 100 consists of the previous embodiment 10 illustrated in FIG. 1 mounted in a typical housing 110, which is composed of housing subassemblies 112, 114, 116, and 118, and illustrates the simplified mounting configuration and overall compactness of this system.

Referring again to FIG. 2A, at least one optical component from the optical lens assembly 20 is positioned within the first housing subassembly 112. The first housing subassembly 112 defines a first interior longitudinal axis. An optical axis of the optical components positioned within the first housing subassembly 112 is substantially coincident with the first interior longitudinal axis. In the embodiment shown in FIG. 2A, all components 22, 24 and 26 of the optical lens assembly 20 are positioned within the first housing subassembly 112.

The one or more slit elements 30 and at least one optical component from the optical subassembly 40 are positioned within the second housing subassembly 114. The second housing subassembly 114 defines a second interior longitudinal axis. An optical axis of the optical components positioned within the second housing subassembly 114 is substantially coincident with the second interior longitudinal axis. In the embodiment shown in FIG. 2A, the slit element 30, two of the components 42 and 44 of the optical subassembly 40 and the detector 70 are positioned within the second housing subassembly 114. When the second housing subassembly 114 is attached to the first housing subassembly 112, the second interior longitudinal axis is substantially coincident with the first interior longitudinal axis. In a preferred embodiment, the second housing subassembly 114 is removably attached to the first housing subassembly 112. The means for removably attaching include, but are not limited to, screw means (as shown in FIG. 2A), a sliding interference fit with locking means (such as a locking bolt), or a press fit. By removably attaching the second housing subassembly 114 to the first housing subassembly 112 with means that allow variation of position (such as screw means), the focusing of the light originating at the source onto the slit element 30 can be controlled and modified.

The last two housing subassemblies 116, 118 of FIG. 2A can be considered as one housing subassembly, hereinafter referred to as the third housing subassembly 116', since the end-cap housing subassembly 118 is attached to the other housing subassembly 116. At least another optical component from the optical subassembly 40 and the reflective dispersive element (or elements) 50 are positioned within the third housing subassembly 116'. The third housing subassembly 116' defines a third interior longitudinal axis. An optical axis of the optical components positioned within the third housing subassembly 116' is substantially coincident with the third interior longitudinal axis. In the embodiment shown in FIG. 2A, two other components 46 and 48 of the optical subassembly 40 and the reflective dispersive element (or elements) 50 are positioned within the third housing subassembly 116'. When the third housing subassembly 116' is attached to the second housing subassembly 114, the third interior longitudinal axis is substantially coincident with the second interior longitudinal axis. The third housing subassembly 116' may be removably attached to the second housing subassembly 112.

Figure 2B:
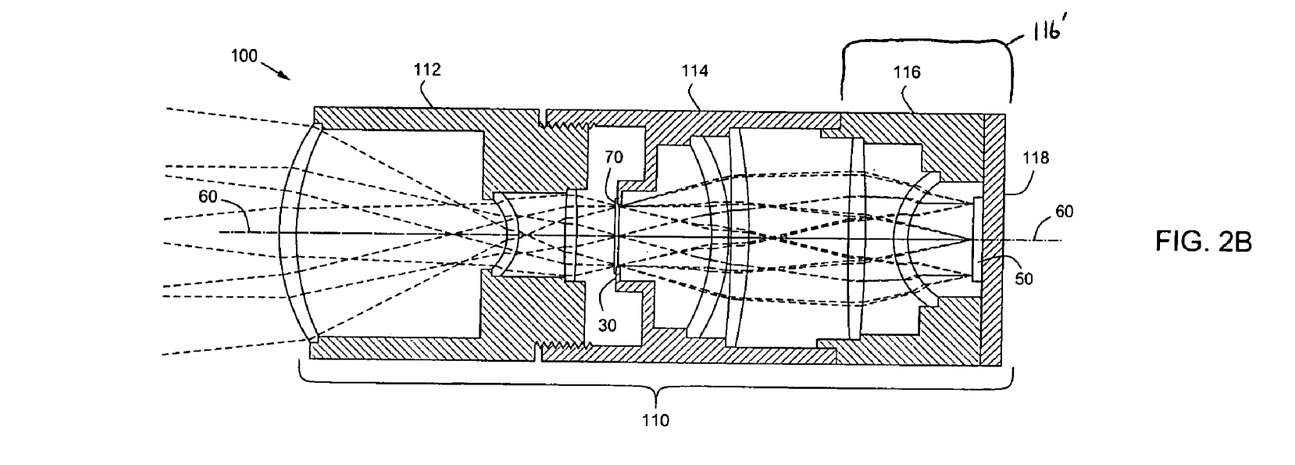

Reference is made to FIG. 2B, which is a schematic sectional view of system 100, taken along the optical axis 60 in the plane perpendicular to the direction of dispersion. In operation, light originating at the source is imaged by the optical lens assembly mounted in the mechanical housing 112 onto the slit element 30, which is then collimated by the optical lens assembly mounted in the mechanical housings 114 and 116. This collimated light is then reflected by the dispersing element 50 mounted on the mechanical assembly 118 such that it is re-imaged by the same optical lens assembly mounted in the mechanical housings 114 and 116 onto the detecting element 70 with, but not limited to, unity magnification and a sufficiently broad and flat field over the entire extent of the image. This illustrates the spatial imaging characteristics of the system that are orthogonal to the spectral imaging characteristics and have not been degraded by the inline configuration of the lens assemblies.

Figure 3:
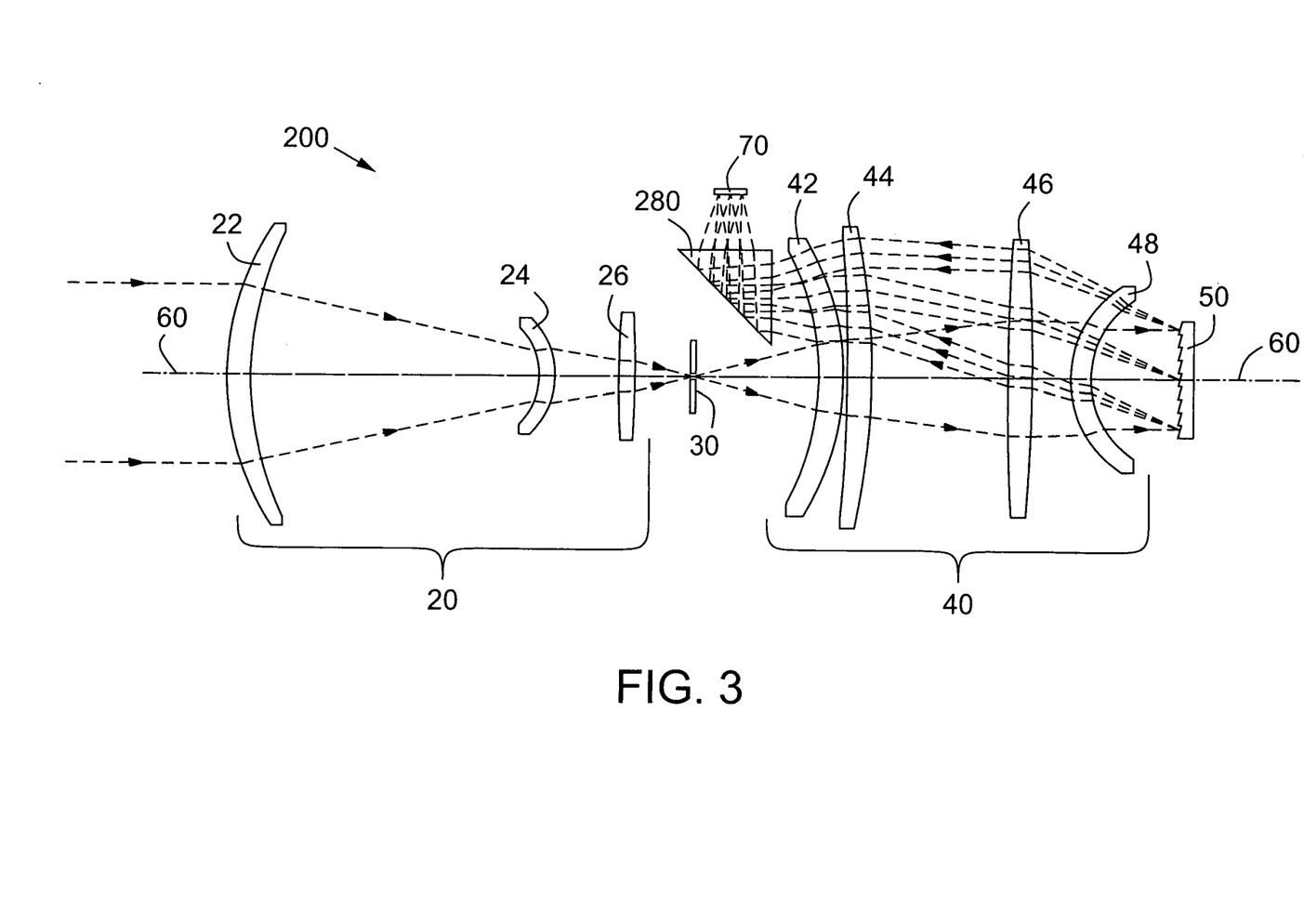
FIG. 3 is a schematic sectional view of another embodiment of an inline hyperspectral imager of the present invention, taken along the optical axis in the plane parallel to the direction of dispersion.

Reference is made to FIG. 3, which is a schematic sectional view of a further embodiment of this invention 200, taken along the optical axis 60 in the plane parallel to the direction of dispersion, and illustrates a modification of the embodiment 10 where a redirecting optical element, a fold prism 280 in the embodiment shown, has been inserted in front of the detecting element 70 to redirect the image away from the imaging lens 20. (The fold prism 280 can be referred to as being inserted between the optical assembly 40 and the image surface.) This allows an increased accessibility to the detecting element 70 without compromising the compact nature of the inline imaging lens 20 and optical assembly 40.

Figure 4A:
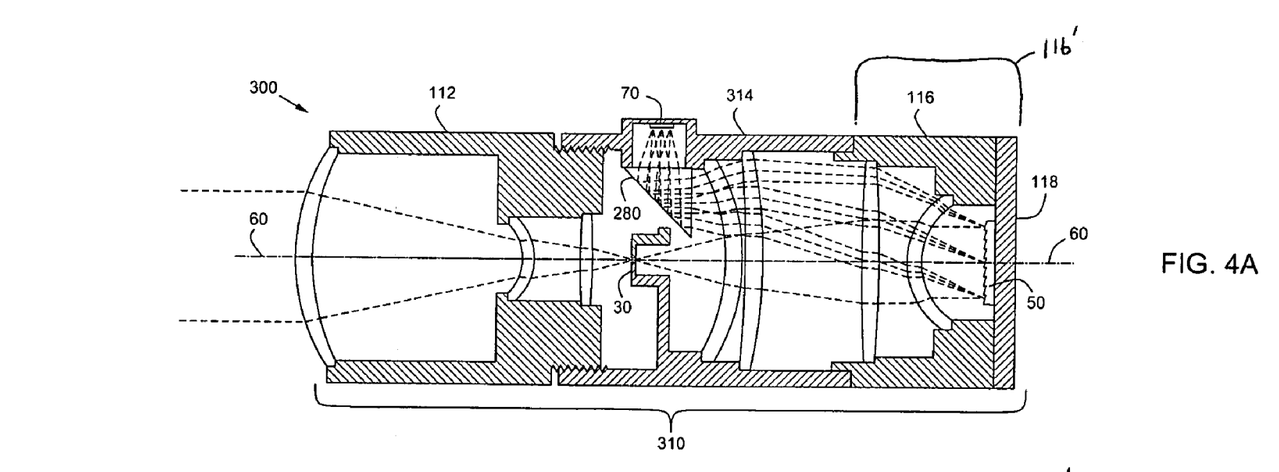
FIGS. 4A–4B are schematic sectional views of the embodiment of the present invention illustrated in FIG. 3 mounted in a typical housing, taken along the optical axis in the plane parallel to the direction of dispersion (FIG. 4A) and in the plane perpendicular to the direction of dispersion (FIG. 4B)

Some of the advantages of the above embodiment can be seen in FIG. 4A, which illustrates a mounted version of system 200 in the present invention, taken along the optical axis 60 in the plane parallel to the direction of dispersion. The mounted system 300 of FIG. 4A consists of a modification of the previous embodiment 200 illustrated in FIGS. 2A and 2B mounted in a typical housing 310, which is composed of housing subassemblies 112, 314, 116, and 118, and illustrates the increased accessibility to the detecting element 70, which is now located at the outside of the mechanical housing 314, without compromising the compact nature of the system. Housing subassemblies 112, 116, and 118 are unchanged from embodiment shown in FIGS. 2A and 2B. The redirecting optical element (the fold prism) 280, the detecting element 70, one or more one slit elements 30 and at least one optical component from the optical subassembly 40 are positioned within the second housing subassembly 314.

Figure 4B:
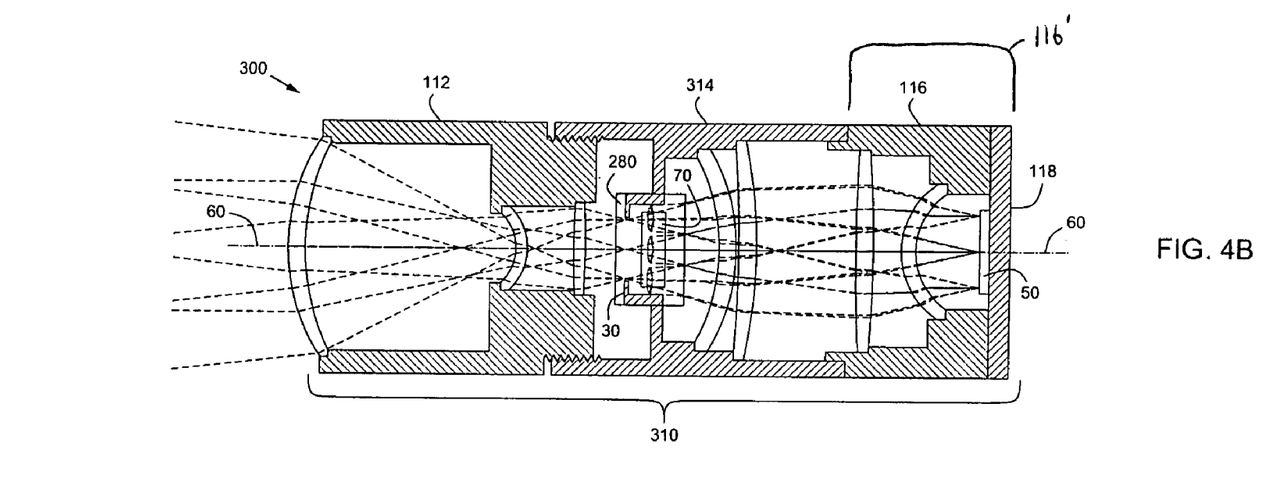

Reference is made to FIG. 4B, which is a schematic sectional view of system 300, taken along the optical axis 60 in the plane perpendicular to the direction of dispersion and illustrates the spatial imaging characteristics of the system that are orthogonal to the spectral imaging characteristics and have not been degraded by the inline configuration of the lens assemblies.

Figure 5:
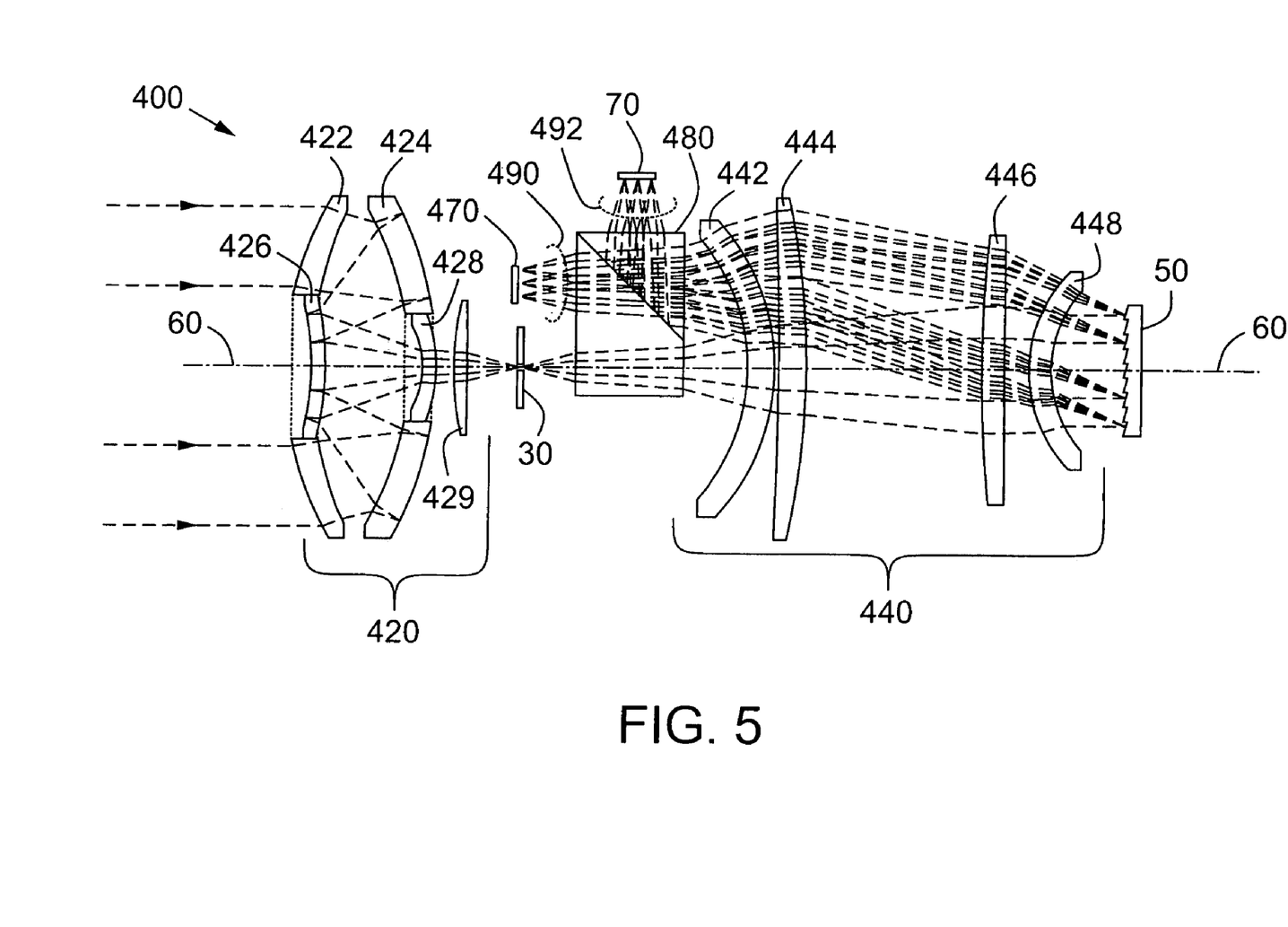
FIG. 5 is a schematic sectional view of yet another embodiment of an inline hyperspectral imager of the present invention, taken along the optical axis in the plane parallel to the direction of dispersion.

Reference is made to FIG. 5, which is a schematic sectional view of an embodiment of this invention 400, taken along the optical axis 60 in the plane parallel to the direction of dispersion, and illustrates a modification of the embodiment 200 where two separate spectral bands are dispersed over two detecting elements 70 and 72. Light emitted or reflected by a given object, either real or virtual, is imaged by the imaging lens 420 comprised of one or more reflective or refractive elements, in this embodiment made up of catadioptric elements 422, 424, 426, 428, and 429, onto a slit element 30. Light emanating from the slit element 30 is collimated by the optical subassembly 440 comprised of one or more refractive elements, in this embodiment made up of refractive elements 442, 444, 446, and 448 that is inline with the imaging lens 420 such that they share a common optical axis 60, and is incident upon a reflective dispersing element 50. The first spectral band is diffracted at various angles according to wavelength, and re-imaged by the optical subassembly 440, passing through a redirecting/transmitting optical element (a fold prism assembly in the embodiment shown in FIG. 5) 480, which reflects the dispersed first spectral band onto the detecting element 70. (The fold prism assembly 480 can be referred to as being inserted between the optical assembly 40 and the image surface.) The second spectral band is also diffracted at various angles according to wavelength, but for a diffracting order that is different from the first band, and re-imaged by the same optical subassembly 440, passing through the fold prism assembly 480, which transmits the dispersed spectral band to another detecting element 470. (The optical subassembly 440 can be referred to as imaging, onto another image surface, the transmitted second spectral band.) This embodiment provides many advantages including, but not limited to, the ability to replace two conventional single band spectrometers with a single dual band spectrometer, and an increase in throughput over a single broad band spectrometer since the diffraction efficiency obtained by splitting the spectrum over multiple orders of diffraction is generally greater than that obtained by dispersing the entire spectrum over a single order of diffraction.

Figure 6A:
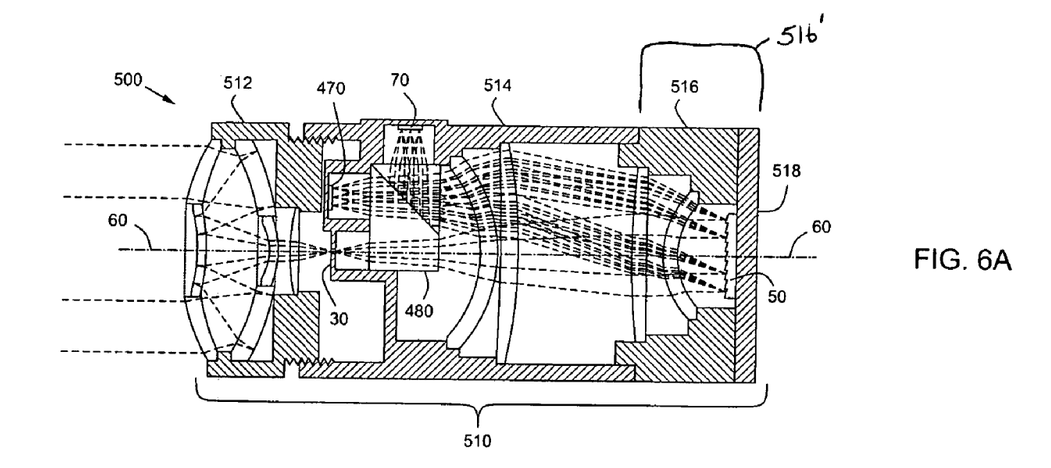
FIGS. 6A–6B are schematic sectional views of the embodiment of the present invention illustrated in FIG. 5 mounted in a typical housing, taken along the optical axis in the plane parallel to the direction of dispersion (FIG. 6A) and in the plane perpendicular to the direction of dispersion (FIG. 6B)

Some of the advantages of the above embodiment can be seen in FIG. 6A, which illustrates a mounted version of system 400 in the present invention, taken along the optical axis 60 in the plane parallel to the direction of dispersion. This mounted system 500 consists of the previous embodiment 400 illustrated in FIG. 4 mounted in a typical housing 510, which is composed of housing subassemblies 512, 514, 516, and 518. The fold prism assembly 480 is positioned such that both detecting elements do not obstruct the path of the light through the system without compromising the overall compactness of the system.

The mounted system 500 of FIG. 6A consists of a modification of the previous embodiment 200 illustrated in FIGS. 2A and 2B mounted in a typical housing 510, which is composed of housing subassemblies 512, 514, 516, and 518. Housing subassemblies 116 and 118 are unchanged from embodiment shown in FIGS. 2A and 2B. Housing subassembly 512 is similar to housing subassembly 112 of FIGS. 2A and 2B. The redirecting/transmitting optical element (the fold prism) 480, the detecting element 70, the other detecting element 470, one or more one slit elements 30 and at least one optical component from the optical subassembly 40 are positioned within the second housing subassembly 514.

Figure 6B:
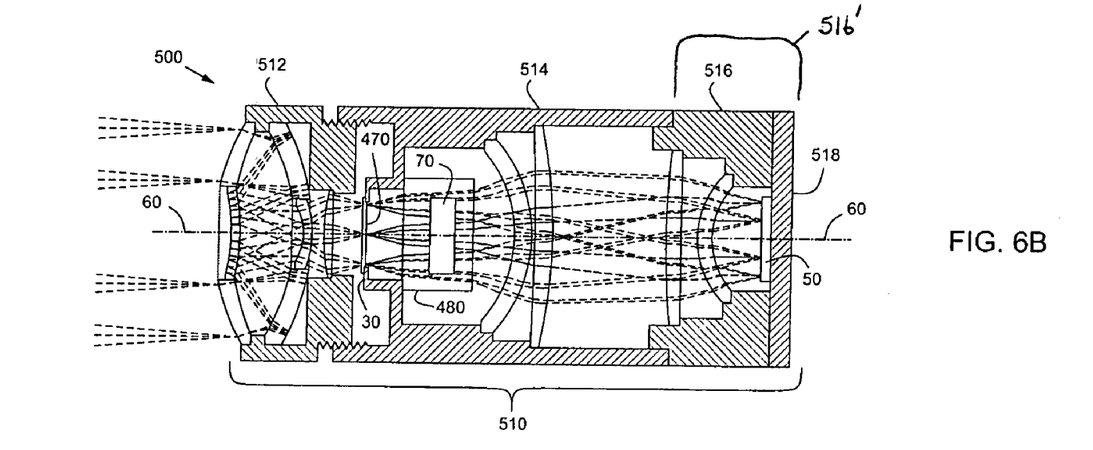

Reference is made to FIG. 6B, which is a schematic sectional view of system 500, taken along the optical axis 60 in the plane perpendicular to the direction of dispersion and illustrates the spatial imaging characteristics of the system that are orthogonal to the spectral imaging characteristics and have not been degraded by the inline configuration of the lens assemblies.

It should be noted that although the embodiments described above have utilized one slit element and one dispersive element. Embodiments with more than one slit element and/or more than one dispersive element are within the scope of this invention.

Although the invention has been described with respect to various embodiments, it should be realized this invention is also capable of a wide variety of further and other embodiments within the spirit and scope of the appended claims.

What is claimed is:

1. A hyperspectral imager comprising:
a first optical sub-system;
at least one slit element;
said first optical sub-system being capable of imaging, onto said at least one slit element, electromagnetic radiation emanating from a source;
a second optical sub-system;
said second optical sub-system being capable of substantially collimating, at a center plane, electromagnetic radiation emanating from said at least one slit element;
at least one reflective dispersive element located substantially at the center plane;
said second optical sub-system also being capable of imaging, onto an image surface, the electromagnetic radiation reflected from said at least one reflective dispersive element;

at least one detecting element located substantially at the image surface;

said at least one detecting element being capable of detecting dispersed electromagnetic radiation reflected from said at least one reflective dispersive element;

a first sub-housing;
 at least one optical component from said first optical sub-system being positioned within said first sub-housing;
 said first sub-housing defining a first interior longitudinal axis;
 an optical axis of said at least one of optical component from said first optical sub-system being substantially coincident with said first interior longitudinal axis; and, a second sub-housing;
 said at least one slit element and at least one optical component from said second optical sub-system being positioned within said second sub-housing;
 said second sub-housing defining a second interior longitudinal axis;
 an optical axis of said at least one of optical components from said second optical sub-system being substantially coincident with said second interior longitudinal axis;
 said second sub-housing being attached to said first sub-housing;
 said second interior longitudinal axis being substantially coincident with said first interior longitudinal axis;

a third sub-housing;
 at least another optical component from said second optical sub-system and said
 at least one reflective dispersive element being positioned within said third sub-housing;
 said third sub-housing defining a third interior longitudinal axis;
 an optical axis of said at least another optical component from said second optical sub-system being substantially coincident with said third interior longitudinal axis;
 said second sub-housing being attached to said third sub-housing;
 said second interior longitudinal axis being substantially coincident with said third interior longitudinal axis.

2. The hyperspectral imager of claim 1 wherein said second sub-housing is removably attached to said first sub-housing.

3. The hyperspectral imager of claim 1 wherein said third sub-housing is removably attached to said second sub-housing.

4. The hyperspectral imager of claim 1 wherein said at least one detecting element is positioned within said second sub-housing.

5. A hyperspectral imager comprising:
a first optical sub-system;
at least one slit element;
said first optical sub-system being capable of imaging, onto said at least one slit element, electromagnetic radiation emanating from a source;
a second optical sub-system;
said second optical sub-system being capable of substantially collimating, at a center plane, electromagnetic radiation emanating from said at least one slit element;
at least one reflective dispersive element located substantially at the center plane;
said second optical sub-system also being capable of imaging, onto an image surface, the electromagnetic radiation reflected from said at least one reflective dispersive element; and,
at least one detecting element located substantially at the image surface;
said at least one detecting element being capable of detecting dispersed electromagnetic radiation reflected from said at least one reflective dispersive element;
a redirecting optical element optically disposed between said second optical sub-system and the image surface;
a first sub-housing;
 at least one optical component from said first optical sub-system being positioned within said first sub-housing;
 said first sub-housing defining a first interior longitudinal axis;
 an optical axis of said at least one of optical component from said first optical sub-system being substantially coincident with said first interior longitudinal axis;
a second sub-housing;
 said at least one slit element, said redirecting optical element and at least one optical component from said second optical sub-system being positioned within said second sub-housing;
 said second sub-housing defining a second interior longitudinal axis;
 an optical axis of said at least one of optical components from said second optical sub-system being substantially coincident with said second interior longitudinal axis;
 said second sub-housing being attached to said first sub-housing;
 said second interior longitudinal axis being substantially coincident with said first interior longitudinal axis;
a third sub-housing;
 at least another optical component from said second optical sub-system and said
 at least one reflective dispersive element being positioned within said third sub-housing;
 said third sub-housing defining a third interior longitudinal axis;
 an optical axis of said at least another optical component from said second optical sub-system being substantially coincident with said third interior longitudinal axis;
 said second sub-housing being attached to said third sub-housing;
 said second interior longitudinal axis being substantially coincident with said third interior longitudinal axis.

6. The hyperspectral imager of claim 5 wherein said second sub-housing is removably attached to said first sub-housing.

7. The hyperspectral imager of claim 5 wherein said third sub-housing is removably attached to said second sub-housing.

8. The hyperspectral imager of claim 5 wherein said at least one detecting element is positioned within said second sub-housing.

9. A hyperspectral imager comprising:
a first optical sub-system;
at least one slit element;
said first optical sub-system being capable of imaging, onto said at least one slit element, electromagnetic radiation emanating from a source;

a second optical sub-system;
said second optical sub-system being capable of substantially collimating, at a center plane, electromagnetic radiation emanating from said at least one slit element;
at least one reflective dispersive element located substantially at the center plane;
said second optical sub-system also being capable of imaging, onto an image surface, the electromagnetic radiation reflected from said at least one reflective dispersive element; and,
at least one detecting element located substantially at the image surface;
said at least one detecting element being capable of detecting dispersed electromagnetic radiation reflected from said at least one reflective dispersive element;
a redirecting/transmitting optical element optically disposed between said second optical sub-system and the image surface;
said second optical system also being capable of imaging, onto another image surface, a transmitted portion of the electromagnetic radiation reflected from said at least one reflective dispersive element; and,
at least one other detecting element located substantially at the another image surface;
a first sub-housing;
  at least one optical component from said first optical sub-system being positioned within said first sub-housing;
  said first sub-housing defining a first interior longitudinal axis;
  an optical axis of said at least one of optical component from said first optical sub-system being substantially coincident with said first interior longitudinal axis;
a second sub-housing;
  said at least one slit element, said redirecting/transmitting optical element and at least one optical component from said second optical sub-system being positioned within said second sub-housing;
  said second sub-housing defining a second interior longitudinal axis;
  an optical axis of said at least one of optical components from said second optical sub-system being substantially coincident with said second interior longitudinal axis;
  said second sub-housing being attached to said first sub-housing;
  said second interior longitudinal axis being substantially coincident with said first interior longitudinal axis;
a third sub-housing;
  at least another optical component from said second optical sub-system and said
  at least one reflective dispersive element being positioned within said third sub-housing;
  said third sub-housing defining a third interior longitudinal axis;
  an optical axis of said at least another optical component from said second optical sub-system being substantially coincident with said third interior longitudinal axis;
  said second sub-housing being attached to said third sub-housing;
  said second interior longitudinal axis being substantially coincident with said third interior longitudinal axis.

10. The hyperspectral imager of claim 9 wherein said second sub-housing is removably attached to said first sub-housing.

11. The hyperspectral imager of claim 9 wherein said third sub-housing is removably attached to said second sub-housing.

12. The hyperspectral imager of claim 9 wherein said at least one detecting element is positioned within said second sub-housing.

13. A hyperspectral imager comprising:
a first optical sub-system;
at least one slit element;
said first optical sub-system being capable of imaging, onto said at least one slit element, electromagnetic radiation emanating from a source;
a second optical sub-system;
said second optical sub-system being capable of substantially collimating, at a center plane, electromagnetic radiation emanating from said at least one slit element;
at least one reflective dispersive element located substantially at the center plane;
said second optical sub-system also being capable of imaging, onto an image surface, the electromagnetic radiation reflected from said at least one reflective dispersive element; and,
at least one detecting element located substantially at the image surface;
said at least one detecting element being capable of detecting dispersed electromagnetic radiation reflected from said at least one reflective dispersive element,
wherein said first optical sub-system is a catadioptric sub-system.

14. The hyperspectral imager of claim 13 further comprising:
a redirecting/transmitting optical element optically disposed between said second optical sub-system and the image surface;
said second optical system also being capable of imaging, onto another image surface, a transmitted portion of the electromagnetic radiation reflected from said at least one reflective dispersive element; and,
at least one other detecting element located substantially at the another image surface.

15. The hyperspectral imager of claim 14 wherein said first optical sub-system has a first optical axis; and,
said second optical sub-system has a second optical axis;
said second optical axis being substantially parallel to said first optical axis.

16. The hyperspectral imager of claim 14 wherein said first optical sub-system has a first optical axis; and,
said second optical sub-system has a second optical axis;
said second optical axis being substantially coincident with said first optical axis.

17. The hyperspectral imager of claim 14 further comprising:
a first sub-housing;
  at least one optical component from said first optical sub-system being positioned within said first sub-housing;
  said first sub-housing defining a first interior longitudinal axis;
  an optical axis of said at least one of optical component from said first optical sub-system being substantially coincident with said first interior longitudinal axis; a
  second sub-housing;
  said at least one slit element, said redirecting/transmitting optical element and at least one optical component from said second optical sub-system being positioned within said second sub-housing;

said second sub-housing defining a second interior longitudinal axis;

an optical axis of said at least one of optical components from said second optical sub-system being substantially coincident with said second interior longitudinal axis;

said second sub-housing being attached to said first sub-housing;

said second interior longitudinal axis being substantially coincident with said first interior longitudinal axis.

18. The hyperspectral imager of claim 14 wherein the electromagnetic radiation reflected from said at least one reflective dispersive element comprises at least two spectral bands of electromagnetic radiation.

19. The hyperspectral imager of claim 17 wherein the transmitted portion of the electromagnetic radiation reflected from said at least one reflective dispersive element comprises one spectral band from the at least two spectral bands of electromagnetic radiation.

20. The hyperspectral imager of claim 13 wherein said first optical sub-system has a first optical axis; and, said second optical sub-system has a second optical axis;

said second optical axis being substantially parallel to said first optical axis.

21. The hyperspectral imager of claim 13 wherein said first optical sub-system has a first optical axis; and, said second optical sub-system has a second optical axis;

said second optical axis being substantially coincident with said first optical axis.

* * * * *